(12) United States Patent
Haartsen (10) Patent No.: US 6,754,250 B2
(45) Date of Patent: Jun. 22, 2004

(54) NETWORKING IN UNCOORDINATED FREQUENCY HOPPING PICONETS

(75) Inventor: Jacobus Cornelis Haartsen, Hardenberg (NL)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 728 days.

(21) Appl. No.: 09/736,316

(22) Filed: Dec. 15, 2000

(65) Prior Publication Data

US 2002/0075940 A1 Jun. 20, 2002

(51) Int. Cl.⁷ ................................................. H04B 1/69
(52) U.S. Cl. ....................................................... 375/132
(58) Field of Search ................................. 375/130, 131, 375/132, 133, 220, 222, 219; 370/94, 330, 344; 455/444, 463; 342/385

(56) References Cited

U.S. PATENT DOCUMENTS

| | | | |
|---|---|---|---|
| 5,940,431 A | 8/1999 | Haartsen et al. | |
| 6,026,303 A | 2/2000 | Minamisawa | |
| 6,028,853 A | 2/2000 | Haartsen | |
| 6,680,923 B1 * | 1/2004 | Leon | 370/328 |
| 6,683,886 B1 * | 1/2004 | van der Tuijn et al. | 370/458 |
| 2002/0102996 A1 * | 8/2002 | Jenkins | 455/456 |
| 2003/0149794 A1 * | 8/2003 | Morris et al. | 709/249 |

FOREIGN PATENT DOCUMENTS

| | | |
|---|---|---|
| WO | 98/35453 A1 | 8/1998 |
| WO | WO99/37106 | 7/1999 |
| WO | 99/55102 A1 | 10/1999 |
| WO | 00/36757 A2 | 6/2000 |
| WO | WO00/69186 | 11/2000 |

OTHER PUBLICATIONS

"Specification of the Bluetooth System, Specification vol. 1, Wireless Connections Made Easy, CORE, V1.0 B, Chapter 10 Channel Control and Chapter 11 Hop Selection", Dec. 1999, pp. 1, 95–142, XP002222549.
Haartsen, J.: "Bluetooth—The universal radio interface for ad hoc, wireless connectivity", Ericsson Review No. 3, 1998, Stockholm, Sweden, pp. 110–117, XP000783249.
U.S. patent application Ser. No. 08/932,911, Haartsen, filed Sep. 18, 1997.
U.S. patent application Ser. No. 09/210,594, Haartsen et al., filed Dec. 15, 1998.
U.S. patent application Ser. No. 08/685,069, Dent et al., filed Jul. 23, 1996.
U.S. patent application Ser. No. 09/272,212, Haartsen, filed Mar. 19, 1999.
D. Bertsekas and R. Callager, "Data Networks", 2$^{nd}$ Edition, Prentice–Hall, London, 1992 cited on page two of the specification.

(List continued on next page.)

*Primary Examiner*—Emmanuel Bayard
(74) *Attorney, Agent, or Firm*—Burns, Doane, Swecker & Mathis, L.L.P.

(57) ABSTRACT

Networking in uncoordinated frequency hopping piconets includes forming an anchor piconet from a plurality of wireless units that are in range of one another. An anchor unit is selected from the plurality of wireless units. A beacon signal is generated from the anchor unit and the remaining wireless units are locked onto the beacon signal. An additional embodiment the invention in peer-to-peer ad-hoc networking includes establishing at least one anchor piconet and establishing at least one traffic piconet between at least two wireless units in the anchor piconet. The traffic piconet is established using information relayed from the anchor unit to each wireless unit that participates in the traffic piconet. Since the anchor unit knows routing and identification information of all the wireless units, the traffic piconets can be established with minimal delay.

52 Claims, 9 Drawing Sheets

OTHER PUBLICATIONS

A. Kamerman, "Spread Spectrum Techniques Drive WLAN Performance", Microwaves & RF, Sep. 1996, pp. 109–114 cited on page four of the specification.

An article entitled, "Radio Equipment and Systems (RES); High Performance Radio Local Area Networks (HIPER-LANs)", Jul. 1996 cited on page three of the specification.

J. Haartsen, "Bluetooth—The Universal Radio Interface for *ad hoc* Wireless Connectivity", Ericsson Review No. 3, 1998, pp. 110–117 cited on page seven of the specification.

Röhl C., et al., "A Short Look on Power Saving Mechanisms in the Wireless LAN Standard Draft IEEE 802.11", Technical University of Berlin, Telecommunications Networks Group.

* cited by examiner

NETWORKING IN UNCOORDINATED FREQUENCY HOPPING PICONETS

BACKGROUND

This invention relates to frequency hopping (FH) radio systems. In particular, it relates to multiple, uncoordinated FH radios that try to form a wireless network. The invention describes how links between several FH radios can be established and maintained.

Radio Local Area Networks (radio LANs or RLANs) typically cover an area of technology where the computer industry and the wireless communications industry merge. Conventional computer networking has relied on wired LANs, typically packet-switched and designed for data transfer. By contrast, wireless networking (particularly cellular networking) has relied on wide area networks, typically circuit-switched and designed for voice transfer. Most efforts in the design of radio LANs have followed the design principles that are used in wired LANs. However, the best wireless network design may not be obtained using the wired LAN design principles because the environments are different in the wired medium and the wireless medium. Moreover, multimedia communications require additional features due to the special data traffic requirements of data, voice and video. Also, the residential environment has unique requirements that can impact the design of the system.

Almost all of the computer networks today use a wired infrastructure. The wired medium can range from a simple twisted pair to an optical fiber. Due to its shielded and controllable environment, the wired medium has low interference levels and stable propagation conditions. Consequently, the wired medium has potential for high to very high data transmission rates. Within the wired infrastructure, all participants in wired LANs typically share this single medium. The medium constitutes a single channel which is used by only a single one of a number of different users at any given time. To expand user access, time-division multiplexing (TDM) is used to allow different users to access the same channel at different times. The protocols for accessing wired media have been standardized by the IEEE in its 802 series of standards. Typically, multiple access reservation techniques like carrier sensing (e.g., Ethernet, 802.3 Carrier-Sense Multiple Access/Collision Detect (CSMA/CD)) or tokens (e.g., 802.4 token buses, or 802.5 token rings) are used to gain access to the medium. These protocols are used in a distributed sense such that the user occupying the channel reserves the medium by its present transmission or by its token. Using these protocols, every user can hear all data traffic that is transferred on the LAN. In a single LAN, all of the users share not only the channel, but also can access all of the information carried on that channel as well. As the number of users grows, the LAN can be divided into smaller LANs or segments that have independently operating channels. The individual LANs can be interconnected via bridges or routers that form interfaces between the different local networks. These configurations result in more complex networks (see, for example, D. Bertsekas and R. Callager, "Data Networks", 2nd Edition, Prentice-Hall, London, 1992). In discussing residential LANs it is sufficient here to consider a single LAN.

Each LAN typically provides a connectionless packet-switched service. Each packet has a destination address (and usually a source address as well) so that each user can determine whether or not each packet transferred on the LAN is intended for him. The net throughput per user in a single LAN is determined by the peak data rate on the channel and by the number of users that share this channel. Even if the peak data rate is very high (as is expected in the wired medium), the effective user throughput can be low if the channel has to be shared among many users.

Since the type of communication that takes place over wired LANs is typically asynchronous and connectionless, it is ill suited to support delay critical services like voice. Voice services demand synchronous or isochronous connections, which require priority techniques in the Medium Access Control (MAC) protocols. The priority techniques give voice users priority over non-voice users. Different studies evaluating existing data networks have shown that providing voice and other time sensitive data over existing data networks is a difficult task.

During the last several years, standards bodies in the United States and in Europe have worked on wireless LANs (WLANs). However, the United States and Europe have adopted different standards. In the United States, the WLAN standard is the IEEE 802.11 standard (see, Draft Standard IEEE 802.11, P802. 11/D1, Dec. 1994), whereas in Europe, the ETSI HIPERLAN standard has been developed for WLANs (see, ETSI, RES10/96/etr, "Radio Equipment and Systems (RES); High Performance Radio Local Area Networks (HIPERLANs)", July 1996).

The IEEE 802.11 standard, as the name indicates, is an extension of the 802 LAN standard. The wireless connection is either a radio link or an infrared link. The radio link can be established using the Industrial, Scientific, Medical (ISM) band at 2.4 GHz. The standard provides for only a 1–2 Mb/s channel for each single WLAN at any given time. This relatively narrow bandwidth channel has to be shared among all users of the radio network. The standard defines both a configuration based on a wired infrastructure and a configuration based on an ad-hoc structure. With a wired infrastructure, the radio system merely provides a wireless extension between the wired LAN and the user terminal. Fixed access points interface between the wireline domain and wireless domain. In an ad-hoc network, wireless units create their own wireless network. No wired backbone is involved at all. It is the ad-hoc nature provided with wireless communications that gives the WLANs an important advantage over wired LANs in certain applications.

To avoid interference with other networks or other applications in the 2.4 GHz ISM band, either direct-sequence spreading or slow frequency hopping is used. Access to the channel is accomplished by a special form of Carrier-Sense Multiple Access/Collision Avoidance (CSMA/CA) that provides a connectionless service. In an architecture based on a wired infrastructure, the fixed part takes the role of a central controller which schedules all traffic. In an ad-hoc architecture, the distributed CSMA/CA protocol provides the multiple access to the channel. In general, the IEEE 802.11 standard is very similar to that of the wired Ethernet, except the wire has been replaced by a 1 Mb/s radio channel.

The effective user throughput decreases quickly as the number of participants increases. In addition, little immunity is provided against interference in the ISM band because the spreading factor for Direct Sequence Spread Spectrum (DSSS) is only 11 and the spreading factor for Frequency Hopping Spread Spectrum (FHSS) is only on the order of 79 channels. Different networks can theoretically coexist in the same area thereby increasing the aggregate throughput. The different networks either use different DSSS carrier frequencies of which seven are defined, or use different FHSS hop sequences. However, the aggregate throughput, defined as the average throughput per user times the number of collocated users (not necessarily participating in the same network), can never exceed 4–6 Mb/s with either technology (see, A. Kamerman, "Spread-Spectrum Techniques Drive WLAN Performance," Microwaves & RF, Sept. 1996, pp. 109–114).

For collocating different networks under the IEEE 802.11 standard, it is preferred that the networks be based on a wired infrastructure. If a limited number of collocated fixed access points can create their own network, then a certain amount of coordination via the wired network is then possible. However, it is much more difficult to create ad-hoc networks under IEEE 802.11, because the MAC protocol does not lend itself to an ad-hoc structure. Instead of forming ad-hoc networks, units that come in range of an existing network will join the existing network and not create their own network.

HIPERLAN has followed a similar path as IEEE 802.11. The system operates in the 5.2 GHz band (not available in the United States). The standard is still under development and consists of a family of sub-standards, HIPERLAN 1 to 4. The most basic part, HIPERLAN I (ETSI, ETS300652, "Radio Equipment and Systems (RES); High Performance Radio Local Area Networks (HIPERLAN) Type 1; Functional Specification", June 1996), is similar to the IEEE 802.11. Again, a single channel is used, but with a higher peak data of 23.5 Mb/s. A dedicated CSMA/CA scheme is used, called Elimination-Yield Non-Preemptive Priority Multiple Access (EYNPMA) which provides for a number of contention-based phases before the channel is reserved. Although the 5.2 GHz band is unlicensed in Europe, only HIPERLAN-type applications are allowed. Therefore, no special measures are implemented against unknown jammers. Different networks can coexist in the same area provided different 23 MHz wide channels are used. Five such channels have been defined in the 5.2 GHz band. The HIPERLAN 2 standardization which concentrates on wireless Asynchronous Transfer Mode (ATM) is also relevant. Presumably, this wireless network will also use the 5.2 GHz band, will support peak data rates exceeding 40 Mb/s, and will use a centralized access scheme with some kind of demand assignment MAC scheme.

Both the existing WLAN and wired LAN systems have a single channel shared among all the participants of the local network. All users share both the medium itself and all information carried over this medium. In the wired LAN, this channel can encompass the entire medium. However, a single channel does not encompass the entire medium in WLANs in general and in particular in RLANs. In RLANs, the radio medium typically has a bandwidth of 80 to 100 MHz. Due to implementation limitations and cost of the radio transceivers and due to restrictions placed by regulatory bodies like the FCC and ETSI, it is virtually impossible to define a radio channel in the RLAN with the same bandwidth as the radio medium. Therefore, only part of the radio medium is used in a single RLAN. As a result, the peak data rate over the channel decreases. Also, the effective user throughput decreases because all participants share this channel, which is now much smaller than the medium. Although the medium is divided into different channels, each of which can be used to set up a different RLAN, in practice, only a single network covers a certain area, especially in ad-hoc networks. In RLANs based on a wired infrastructure, the different channels can be used to create cells, each cell is its own network that is not disturbed by neighboring cells. This result is achieved at the expense of predefining the allocation of channels. Thus, a cellular structure is created that prohibits the use of different ad-hoc radio networks in the same cell, thereby limiting the attainable aggregate throughput per unit area.

Ad-hoc networks by definition do not rely on the support of a wired infrastructure as is commonly used in cellular, cordless and WLAN systems. In cellular systems, access to the wired backbone is accomplished by access points or base stations. These base stations broadcast known control signals that the portable terminals can lock onto. Using the control signals, incoming and outgoing calls can be established and terminals can be directed to dedicated traffic channels. In conventional wireless systems, the activities of the base stations are highly coordinated.

In ad-hoc systems, the situation is completely different. Since ad-hoc systems are based on peer-to-peer connectivity, there is no difference between base stations and terminals (units). Any unit can operate as a base station to establish connections to other units. However, in a peer environment, it is unclear which unit should be the base station. It is also unclear how long a unit should be the base station after becoming one. It is undesirable to have each radio unit broadcast control information because it is not at all certain other units are around to receive this information. In addition, it consumes valuable (battery) power and creates unnecessary interference.

A system, known to the public as a BLUETOOTH™ system, was recently introduced to provide ad-hoc connectivity between portable devices like mobile phones, laptops, Personal Digital Assistants (PDAs), and other mobile devices. This system uses frequency hopping and radios that are low-power, low-cost and have a small footprint. The BLUETOOTH™ system supports both data and voice transmission. The latter are optimized by applying fast frequency hopping with a nominal rate of 800 hops/s through the entire 2.4 GHz ISM band in combination with a robust voice coding. Automatic retransmission is applied on data packets to combat packet failures due to collisions of different piconets (ad-hoc networks) TM visiting the same hop channel. An introduction to the BLUETOOTH™ System can be found in "BLUETOOTH—The universal radio interface for ad-hoc, wireless connectivity," by J. C. Haartsen, Ericsson Review No. 3, 1998.

A BLUETOOTH™ system is a communication system that utilizes frequency hopping wireless technology. This system applies frequency hopping to enable the construction of low-power, low-cost radios with a small footprint. The system supports both data and voice. The latter are optimized by applying fast frequency hopping in combination with a robust voice coding. The frequency hopping has a nominal rate of 1600 hops per second (hops/s) through the entire 2.4 GHz ISM band, which is 80 MHz wide. Devices based on BLUETOOTH™ wireless technology can create piconets, which comprise a master device and one or more slave devices connected via the FH piconet channel. The FH sequence used for the piconet channel is completely determined by the address or identity of the device acting as the master. The system clock of the master device determines the phase in the hopping sequence (i.e., the designation of which one of the possible hops in the sequence is the "current" hop). In BLUETOOTH™ wireless technology, each device has a free-running system clock. Each of the slave devices adds a corresponding time offset to its clock that enables it to become aligned with the clock of the master device. By using the master address to select the proper hopping sequence and by using the time offset to align to the master clock, each slave device keeps in hop synchrony to the master device; that is, master and slave devices remain in contact by hopping synchronously to the same hop frequency or hop carrier. A scatternet is a group of piconets. The aggregate and individual throughput of users in a scatternet is much greater than when each user participates on the same piconet with a 1 Mbit/s channel. For more details, reference is made to U.S. patent application Ser. No. 08/932,911, filed on Sep. 18, 1997 in the name of J. C. Haartsen and entitled "Frequency Hopping Piconets in an Uncoordinated Wireless Multi-user System," which is hereby incorporated herein by reference in its entirety.

The BLUETOOTH™ system also features low-power modes like HOLD and PARK where the slaves can be placed in a temporary suspend or low duty cycle tracking mode, respectively. The park mode is described in U.S. patent application Ser. No. 09/210,594 filed Dec. 15, 1998 entitled "Central Multiple Access Control for FH Radio Networks," by J. C. Haartsen and J. Elg, which is incorporated herein by reference in its entirety.

To find and connect different BLUETOOTH™ units and form an ad-hoc network is not trivial. BLUETOOTH™ units do not broadcast information when they are in standby. Instead, they periodically scan the spectrum for a very short duration. The low-duty cycle scan is important to keep power consumption to a minimum. By default, a BLUETOOTH™ device scans one hop channel for about 11 ms every 1.28 seconds. Therefore, every 1.28 seconds a different hop channel is selected and scanned. The interval of 1.28 seconds can be increased up to 3.84 seconds in very low-power devices. This means that during 3.84 second intervals, the unit is in a sleep mode and cannot be reached by other BLUETOOTH™ units. Since the BLUETOOTH™ units do not routinely broadcast signals, another mechanism has been implemented to discover which units are in range. In this mechanism called inquiry, a request for information is broadcast by the inquirer. The request message can be sent at anytime, but is usually induced by a desire in the device (i.e., by an action of the user) to connect to other devices. On receipt of a request message, the receiving units return an information message including their identity and some more device-specific information. With this information, the inquirer can directly make contact to any of the units that replied using the access technique as described in U.S. Pat. No. 5,940,431 issued Aug. 17, 1999 entitled "Access technique of channel hopping communications system" by J. C. Haartsen and P. W. Dent, which is incorporated herein by reference in its entirety.

One issue concerning establishing connections among BLUETOOTH™ wireless devices or similar FH wireless devices is the speed of the inquiry and page procedures. Since the BLUETOOTH™ unit can sleep for 2.56 seconds between consecutive inquiry scans (i.e., when it scans for a dedicated inquiry message), it may take more than 10 seconds before all units in the surroundings have responded. For many applications, this is an undesirably large time span. Particularly in networking environments, the speed of establishing and releasing connections is preferably less than a second. Therefore, a system and method that accelerate the formation of a network of multiple FH units are needed.

SUMMARY

It should be emphasized that the terms "comprises" and "comprising", when used in this specification, are taken to specify the presence of stated features, integers, steps or components, but the use of these terms does not preclude the presence or addition of one or more other features, integers, steps, components or groups thereof.

The invention overcomes the prior art limitations by providing a method of establishing an anchor piconet comprising identifying a plurality of wireless units within range of one another. Then an anchor unit is selected from the plurality of wireless units. A beacon signal is generated from the anchor unit and the remaining wireless units are locked onto the beacon signal. An additional method of peer-to-peer ad-hoc networking comprises establishing at least one anchor piconet and establishing at least one traffic piconet between at least two wireless units in the anchor piconet using information relayed from the at least one anchor piconet to each wireless unit that participates in the traffic piconet.

The above features and advantages of the invention will be more apparent and additional features and advantages of the invention will be appreciated from the following detailed description of the invention made with reference to the drawings.

BRIEF DESCRIPTION OF THE DRAWINGS

The invention will now be described with reference to the following figures, in which.

DETAILED DESCRIPTION

Before addressing the specifics of the various embodiments of the invention a brief overview of the invention will be provided. The following description makes reference to a BLUETOOTH™ system. However, one skilled in the art will appreciate that the invention is not limited to applications in BLUETOOTH™ systems, but rather may be practiced in any system that provides for frequency hopping and peer-to-peer communication via ad-hoc networks.

The system described herein comprises multiple peer radio units that are within range of one another (i.e., able to establish a communication link with one another). A limited number of these units are selected to act as anchor units or floating base stations. In principle, although any radio unit can become an anchor unit only a limited number will be selected to become anchor units. The selection criteria may include the position of the unit with respect to the other units (e.g., as can be derived from the Received Signal Strength Indication (RSSI) measurement), its capabilities to relay information between units (e.g., the number of buffers and/or available memory space), and the like. Preferably, the number of anchor units is the minimum required to give radio coverage to all units participating in the network (i.e., each wireless unit should be capable of receiving a signal from at least one anchor unit). As long as there is at least one other unit in range of an anchor unit, the anchor unit broadcasts a beacon signal. The beacon signal is sent on a frequency hopping channel. The sequence and phase are determined by the identity and system clock of the anchor unit. Units that are not anchors listen to the beacons. Preferably, a unit should listen to as many beacons as it can hear. However, a unit should be locked (parked) to at least one beacon. Routing and identity information of all wireless units in the anchor piconet is concentrated in the anchor unit. Preferably, anchor units exchange this routing and identity information among one another. The routing and identity information is regularly updated since units can leave and enter the network. Requests for connections are carried out by the anchors. Since all units are synchronized by the beacons, the delay in connection requests depends only on the beacon interval, which can be much smaller than the sleep interval in the standby mode. Additionally, since the units are locked to the beacon, the scanning time can be significantly shorter. Thus, the interval between consecutive scans can be shorter as well.

The anchor units along with the parked units form a second level of a scatternet. Below the anchor level, there is a traffic level where separate piconets can be created and released between individual units when data transmission between the individual units is required. Traffic level piconets are established and released via the anchor level to speed up the connection process. Additionally, to join the anchor network, a unit must connect to an anchor by the conventional inquiry procedures that are used when the units are not yet synchronized. The process of joining an anchor network can take up to several seconds due to the sleep intervals of the units in standby. Once joined to the anchor piconet, units can make connections on the order of the beacon interval, about 10–100 ms, since all are synchronized to the anchor units.

The invention will now be described in greater detail in connection with exemplary embodiments. The exemplary system described here is based on the FH radio air interface as described in U.S. patent application Ser. No. 08/685,069 entitled "Short-range radio communications system and method of use," by P. W. Dent and J. C. Haartsen, filed Jul. 23, 1996, which is hereby incorporated herein by reference in its entirety. The exemplary method of channel access is based on the channel access method described in U.S. Pat. No. 5,940,431 entitled "Access Technique of Channel Hopping Communications System," by J. C. Haartsen and P. W. Dent, granted Aug. 17, 1999, which is hereby incorporated herein by reference in its entirety. The concepts of connectivity for devices using this air interface are further described in U.S. patent application Ser. No. 08/932,911 entitled "FH piconets in an uncoordinated wireless multi-user system," by J. C. Haartsen, filed Sep. 18, 1997, and in U.S. patent application Ser. No. 08/932,244 entitled "Contemporaneous connectivity to multiple piconets" by J. C. Haartsen, filed Sep. 18, 1997, which is hereby incorporated herein by reference in its entirety. The mentioned air interface has been the foundation for the BLUETOOTH™ air interface, described in the "Specification of the BLUETOOTH™ system," v 1.0 draft foundation, Jul. 5, 1999. The air interface is a physical interface where the transceiver alternately transmits and receives to support a duplex link (i.e., time-division duplex). Additionally, each time slot is transmitted at a different hop frequency according to a pseudo-random hop pattern.

The air interface describes a physical interface where the transceiver alternately transmits and receives to support a duplex link, so-called time-division duplex. In addition, each time slot is transmitted at a different hop frequency according to a pseudo-random hop pattern. The hop pattern is determined by the identity of one of the units participating in the link. The phase in the hop pattern is determined by the native system clock of that same unit. During a connection setup, the identity and clock are transferred from one unit to the other unit so that both can use the same hopping pattern and phase and thus stay in synchrony.

A unit in standby wakes up at regular intervals to scan for page messages or inquiry messages. A unit that wants to discover which units are in the surroundings can broadcast an inquiry message, thereby requesting receiving units to return a message revealing their identity and some additional device specific information. Using the information returned by the receiving units, the inquirer identifies units that are in range. Then, the inquirer can make a connection to one or more units in range by a paging procedure, wherein a message including a specific identity is sent to the desired unit. Both the inquiry and the paging procedure can cause delays in forming connections. For instance, during wake up, a unit in standby listens to a single hop frequency for the page or inquiry message. For every new wake up instant, a new wake up hop frequency is selected from a 32-hop pseudo-random sequence. A unit broadcasting a page or inquiry message sequentially sends the page or inquiry message on all 32 hop channels of the page or inquiry sequence. Since the pager/inquirer does not know the wake up time or FH channel of the recipient, it has to repeat sending the messages on the different frequencies for at least the sleep interval (i.e., the interval between consecutive wake up instances). The sleep interval is preferably large in order to keep the scan/sleep duty cycle very low, thereby minimizing power consumption during standby. However, this large sleep interval increases the time before a page or an inquiry message can be received and responded to.

Figure 1:
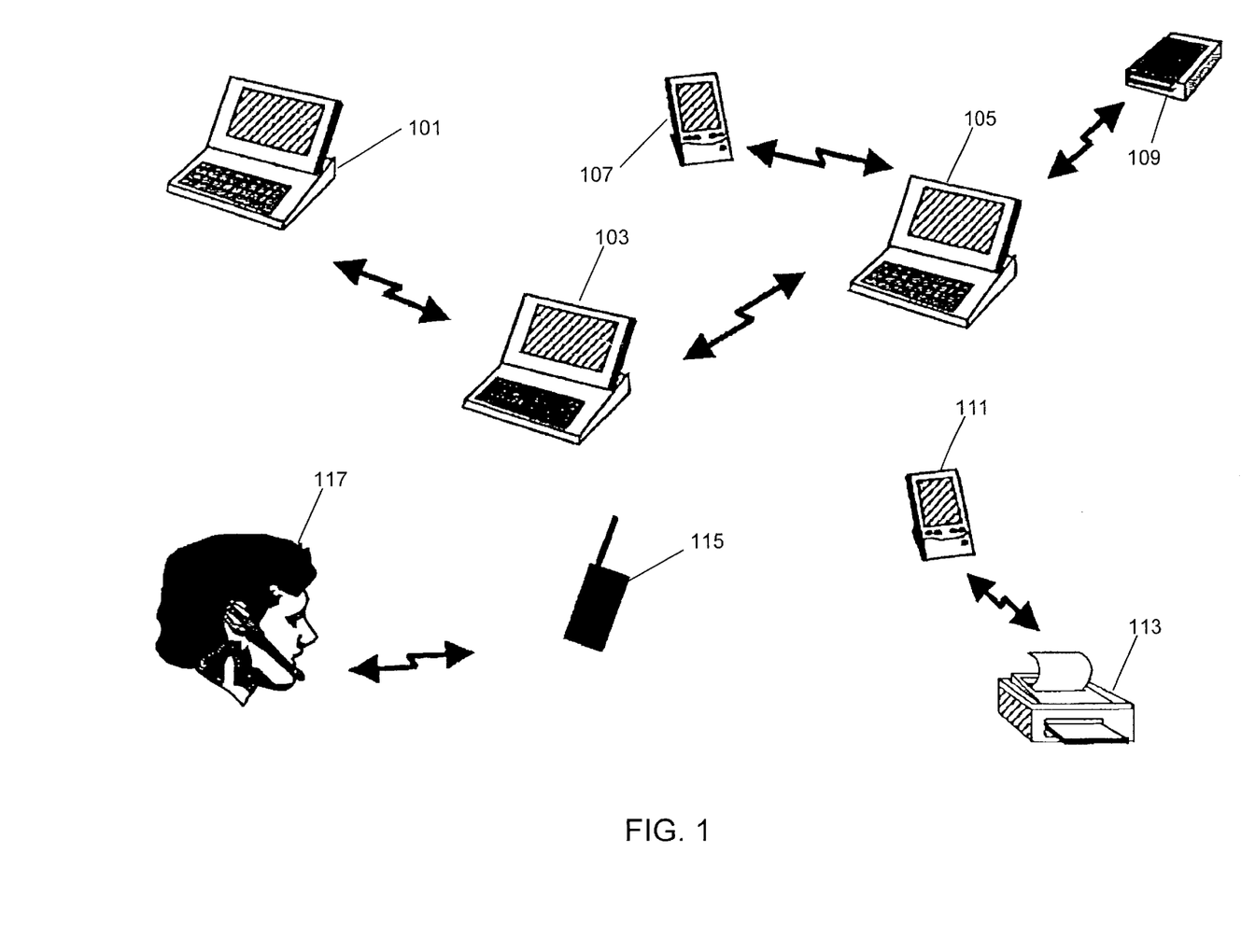
FIG. 1 is an exemplary system of the invention showing multiple devices.

FIG. 1 shows a typical user scenario where the ad-hoc radio connections in accordance BLUETOOTH™ technology are used. For instance, in an office room, different uncoordinated radio links are established between nomadic devices. Laptop 103 has connections to laptops 101 and 105. Additionally, laptop 105 has connections to PDA 107 and the portable hard disk 109. PDA 111 has a link to printer 113, and cell phone 115 has a link with the wireless headset 117.

Figure 2:
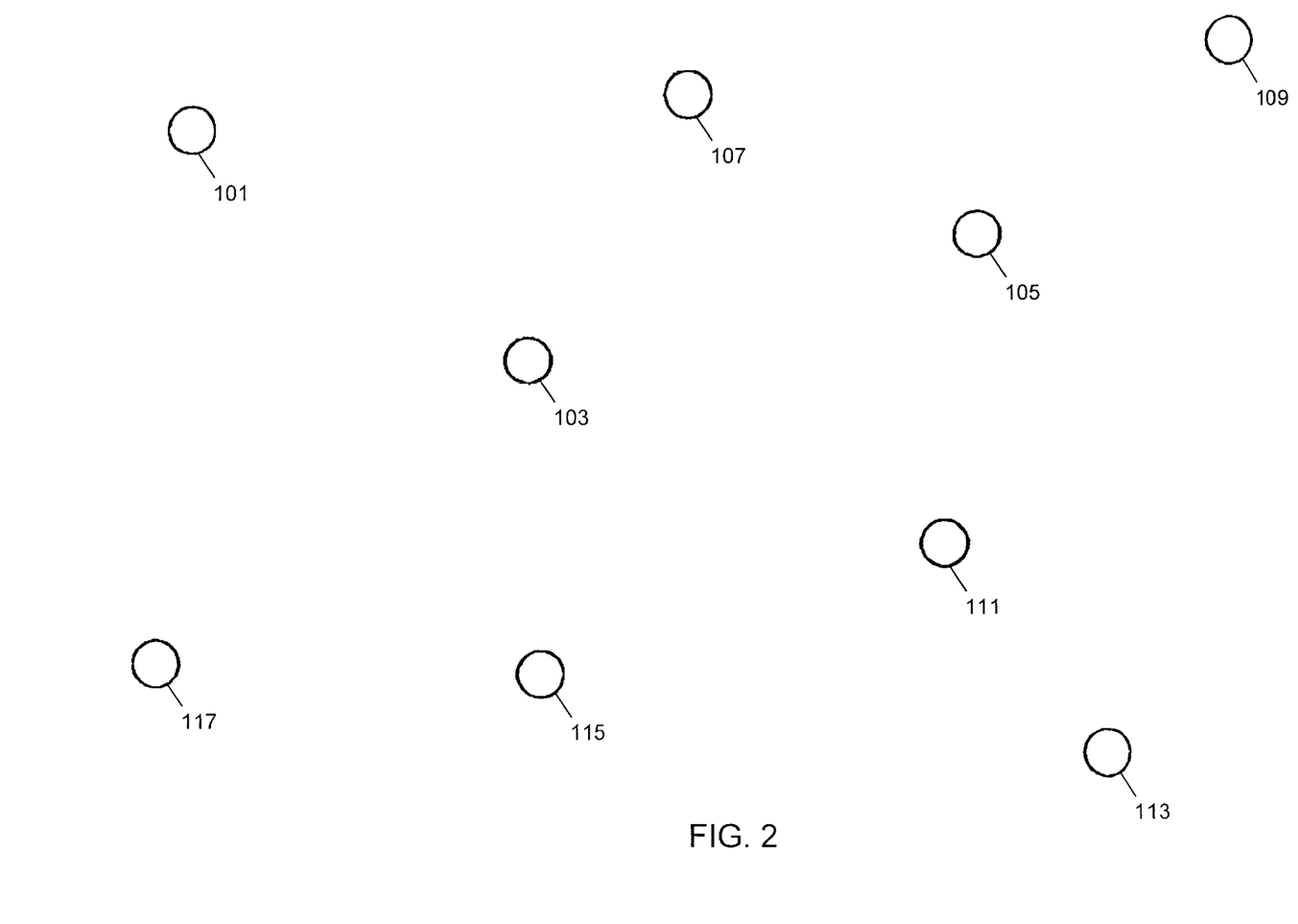
FIG. 2 illustrates general network nodes.

In FIG. 2, a configuration of peer units 101–117 is shown, where the devices of FIG. 1 have been represented as generic network nodes. In a peer-to-peer system as supported by BLUETOOTH™ technology, all units 101–117 have identical communication capabilities with respect to the BLUETOOTH™ technology. Any unit 101–117 can make a connection to any other unit 101–117 in range. If there are no connections as show in FIG. 2, the units 101–117 merely periodically listen for page and/or inquiry messages at a very low duty cycle. After an inquiry and a page routine, or a page routine only, the identities of the recipients are known and piconets can be established.

Figure 3:
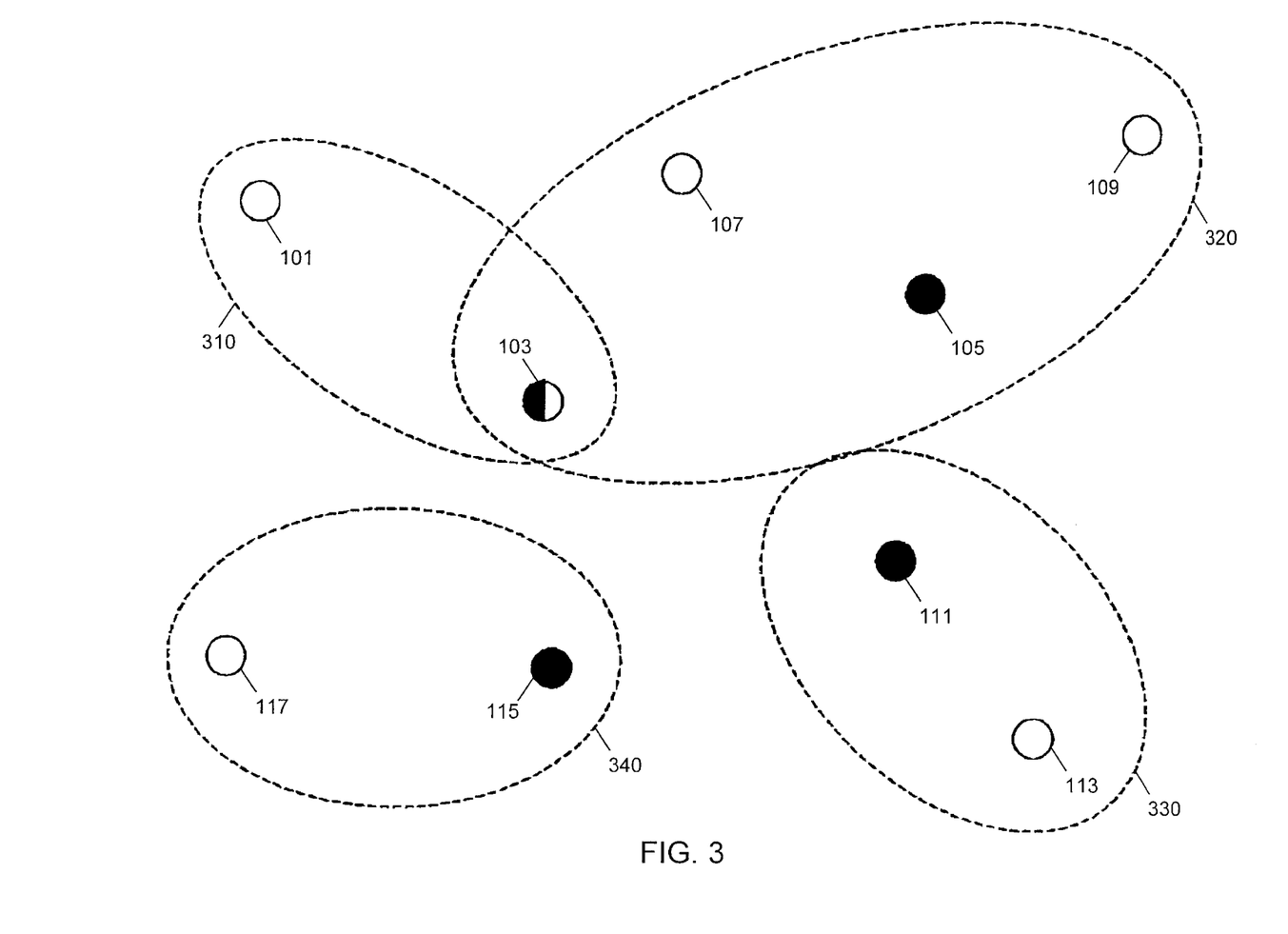
FIG. 3 illustrates piconet and scatternet configurations that are supported by the BLUETOOTH™ standard.

FIG. 3 shows the piconet structure in the example scenario of FIG. 1. Piconets consist of a single master and one or more slaves. The hop sequence for the FH channel used in a piconet is determined by the BLUETOOTH™ identity of the master unit, and the phase in this sequence is determined by the (free-running) system clock of the master unit. Any unit can become a master, which is merely a role in the piconet assigned during the piconet establishment. Units active in a piconet that are not masters are slaves. In the figures, masters and slaves are indicated by filled or open circles, respectively. One piconet 310 is established between laptops 101 and 103, in which laptop 103 is the master. Another piconet 320 is established between laptops 103 and 105, PDA 107 and hard disk 109. Laptop 105 is the master in piconet 320. Laptop 103 participates both in piconet 310 as a master and in piconet 320 as a slave. Laptop 103 has a double role and uses time-division multiplexing to jump between piconet 310 and piconet 320. As laptop 103 jumps between the FH channels of the two piconets, 310 and 320, it changes roles from master to slave and slave to master. Additional piconets 330 and 340 are present in the system. Piconet 330 is established between PDA 111, which is the master, and printer 113. Piconet 340 is established between cell phone 115 and wireless headset 117. Cell phone 115 is the master in piconet 340.

The piconets 310, 320, 330, and 340 form a scatternet. In a scatternet, there may be inter-piconet connections, such as between piconet 310 and 320. Units can participate in several piconets on a time-division multiplexing basis. A unit can be a slave in one piconet and slave or master in another piconet. The piconets operate in an uncoordinated manner. If the units in this scatternet decide to modify the links, for example, if the laptop 101 wants to connect to printer 113, it will take time to establish this connection. If the conventional inquiry and paging procedures are used, it can take several seconds to several tens of seconds before a new piconet is established between laptop 101 and printer 113.

Figure 4:
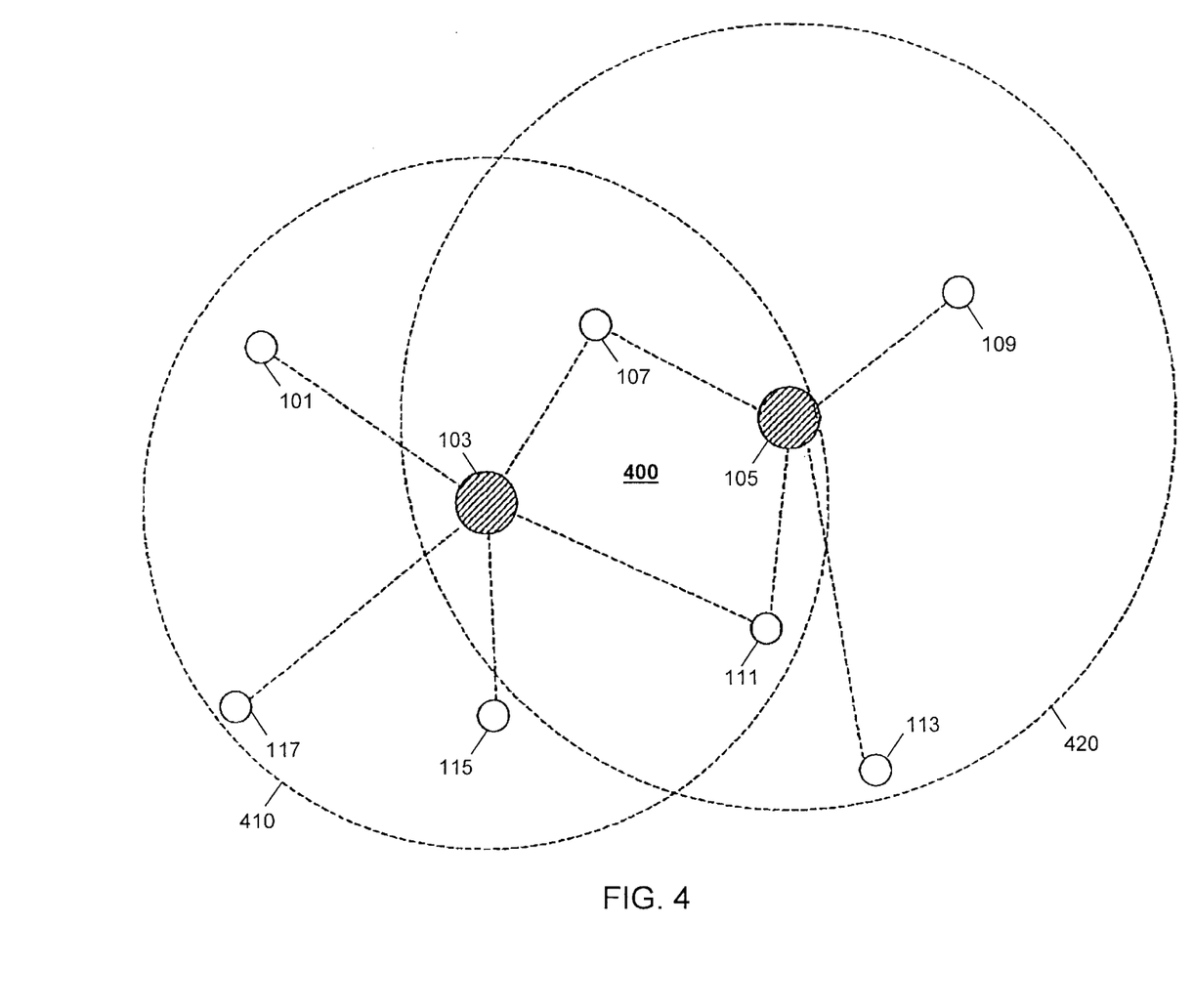
FIG. 4 illustrates an anchored scatternet configuration according to the invention.

In FIG. 4, an exemplary second level of scatternet for the scenario of FIG. 1 is depicted that speeds up the connection establishment between the units in the first level scatternet. The second level of comprises one or more "anchor piconets." Units that have strategic positions with respect to the other units are assigned as anchor units in an anchored scatternet. As with the master assignment, an anchor assignment is only a role given to the unit. A unit does not have to have specific hardware capabilities to become an anchor (nor does it require these to become a master). For example, a strategic position can be based on the unit's coverage of an area that encompasses many other units (i.e., a central location among a number of other units). In FIG. 4, the laptops 103 and 105 are selected as anchor units since all other units are in range of these units. Units 101, 115, and 117 are locked to the anchor unit 103. Units 109 and 113 are locked to anchor unit 105. Units 107 and 111 can be locked to either or both of anchor units 103 and 105. In the configuration depicted in FIG. 4, units 103 and 105 have created two anchor piconets 410 and 420. All remaining wireless units are slaves and are placed in a park mode. The park mode is a low-power mode in which the slaves are not active on the FH piconet channel. However, the slaves listen to the beacon channel with a very low duty cycle. To keep the parked slaves frequency hop locked to the FH channel, the anchor broadcasts a beacon signal with a low duty cycle. Since the beacon packet transmission time is short, on the order of 100 $\mu$s, the beacon interval can be short, on the order of 10–100 ms, and still have a duty cycle on the order of 0.1–1.0%. Parked slaves can readjust their clocks to the beacon signal and then only wake up during the beacon. Also, the beacon is used to activate the slave (i.e., changing the slave from a parked slave to an active slave). Note that the anchor units may participate as slave units in one another's anchor piconets (not shown).

Within its anchor piconet, the anchor unit keeps as many wireless units as possible synchronized to itself. The number of anchor units should be minimized to keep the control manageable. The anchor piconets 410 and 420 form an anchored scatternet 400 in which each unit can reach another unit in the anchored scatternet 400, even though it may require multiple jumps through intermediate units. In parallel with this anchored scatternet 400, a first level of conventional piconets and scatternets is established that deals with the traffic (i.e., normal data communication between the units such as voice, video, data files, and the like).

Figure 5:
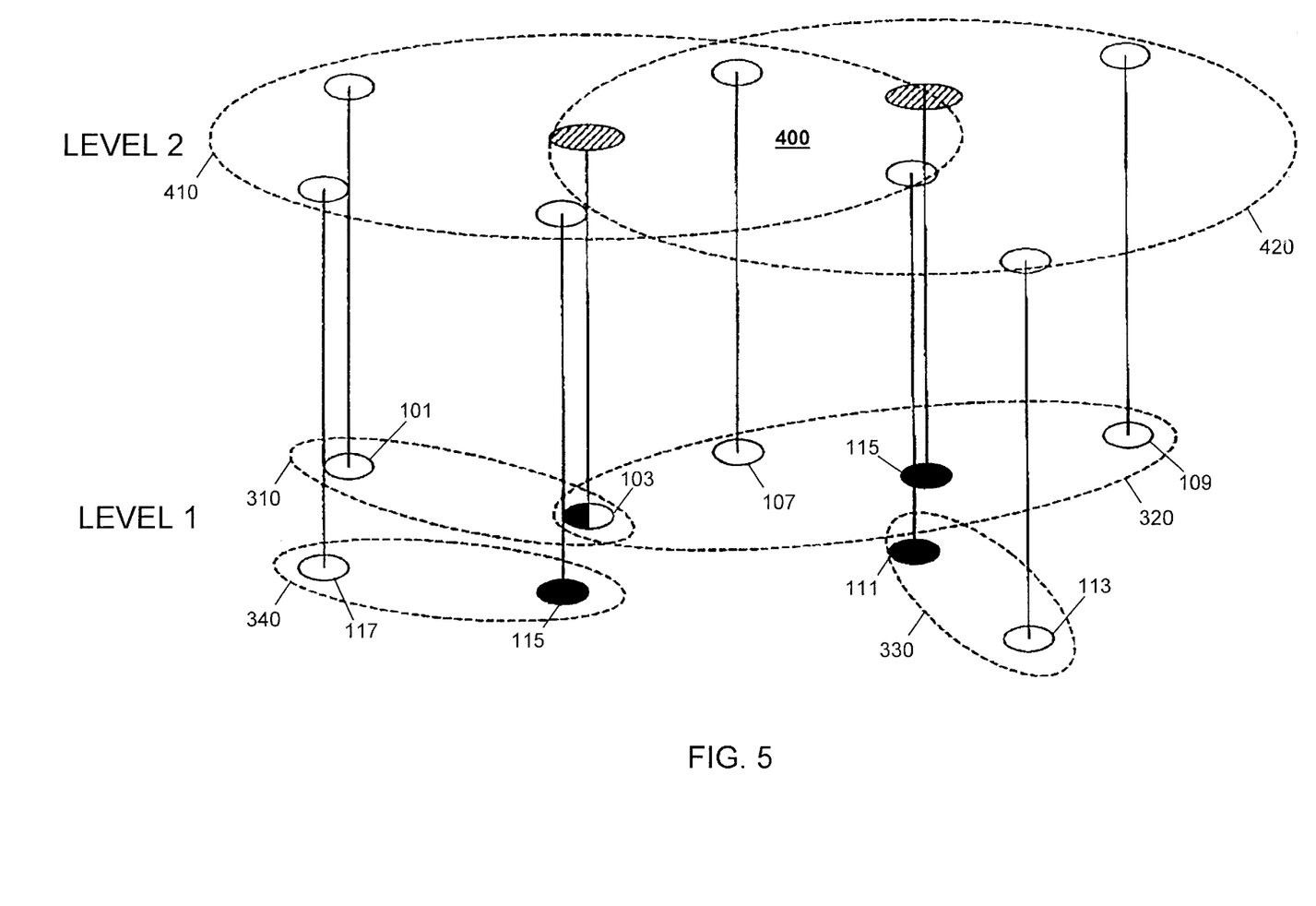
FIG. 5 illustrates anchor and traffic scatternets according to the invention.

FIG. 5. shows the anchored scatternet 400 of FIG. 4 as a higher level above the first level piconet structure of FIG. 3. In FIG. 5, six piconets are shown. The four original piconets, 310–340, form the traffic piconets at level 1 and two anchor piconets, 410 and 420, are at level 2. Each unit participates in at least one piconet at level 2. If a unit is involved in carrying traffic, it also participates in at least one piconet at level 1. When a unit is not involved in carrying traffic at level 1, it does not participate in level 1, but still participates in level 2. Typically, in level 2, a low power mode like park is used. An anchor piconet will show a higher activity level only if a connection in a level 1 piconet or other support operation is required.

The level 1 piconets carry out the instantaneous traffic transactions. The configuration of level 1 is very dynamic. Piconets 310–340 and scatternets are established and released in level 1 as needed for traffic exchange between specific units. In parallel with the activities at level 1, units participate in the anchor piconets 410 and 420 at level 2. There is little activity at level 2 because it mainly involves the park procedure. A parked slave only scans for the beacon for the purpose of re-synchronizing to the anchor unit. When not scanning at level 2, the unit can participate in the piconets at level 1 in a time-division multiplexing fashion. When there is no need for the unit to participate at level 1, the unit only resides in the park state of level 2. An anchor unit at level 2 can participate as a slave or piconet master at level 1. Anchor level 2 and the traffic level 1 are essentially independent of one another. The units switch back and forth between the anchor level 2 and traffic level 1. Units that are active in traffic transactions reside most of the time at level 1, periodically visiting level 2 to re-synchronize. Units that are not active in traffic transactions reside at level 2 as parked units or anchor units that transmit beacon signals.

Advantageously, in level 2, all units are synchronized to only a few anchor units. Therefore, anchor units can set up routes and additional piconets very rapidly via the beacon channel. Since all units are synchronized and all the identity information is available (preferably residing in the anchor units), connections can be established expeditiously without going through the slow inquiry or page procedures. Preferably, anchor units are interconnected at level 2, either directly or via intermediate units. The conventional page procedure can be used to establish connections between units. However, both units are directed by the anchor units to the hop and time where, with high probability, the units will meet, thereby reducing the time to establish the connection.

As long as units are in range of one of the anchor units, the units remain in the anchored scatternet, thereby providing stability in level 2. If a parked unit comes in range of another anchor unit, it may decide to park on the other anchor unit in addition to or instead of parking on its previous anchor. The parked unit may even inform the other anchor unit of its intention to park. In this context it is similar to the procedures described in U.S. patent application Ser. No. 09/272,212 "Uncoordinated FH cellular system," by J. C. Haartsen, filed Mar. 19, 1999, which is hereby incorporated by reference herein in its entirety. If a unit moves out of range of an anchor unit, the anchored scatternet may decide to reassign a formerly parked unit to become an anchor unit. As a result, the anchor assignments may be changed as units change their relative position.

Figure 6:
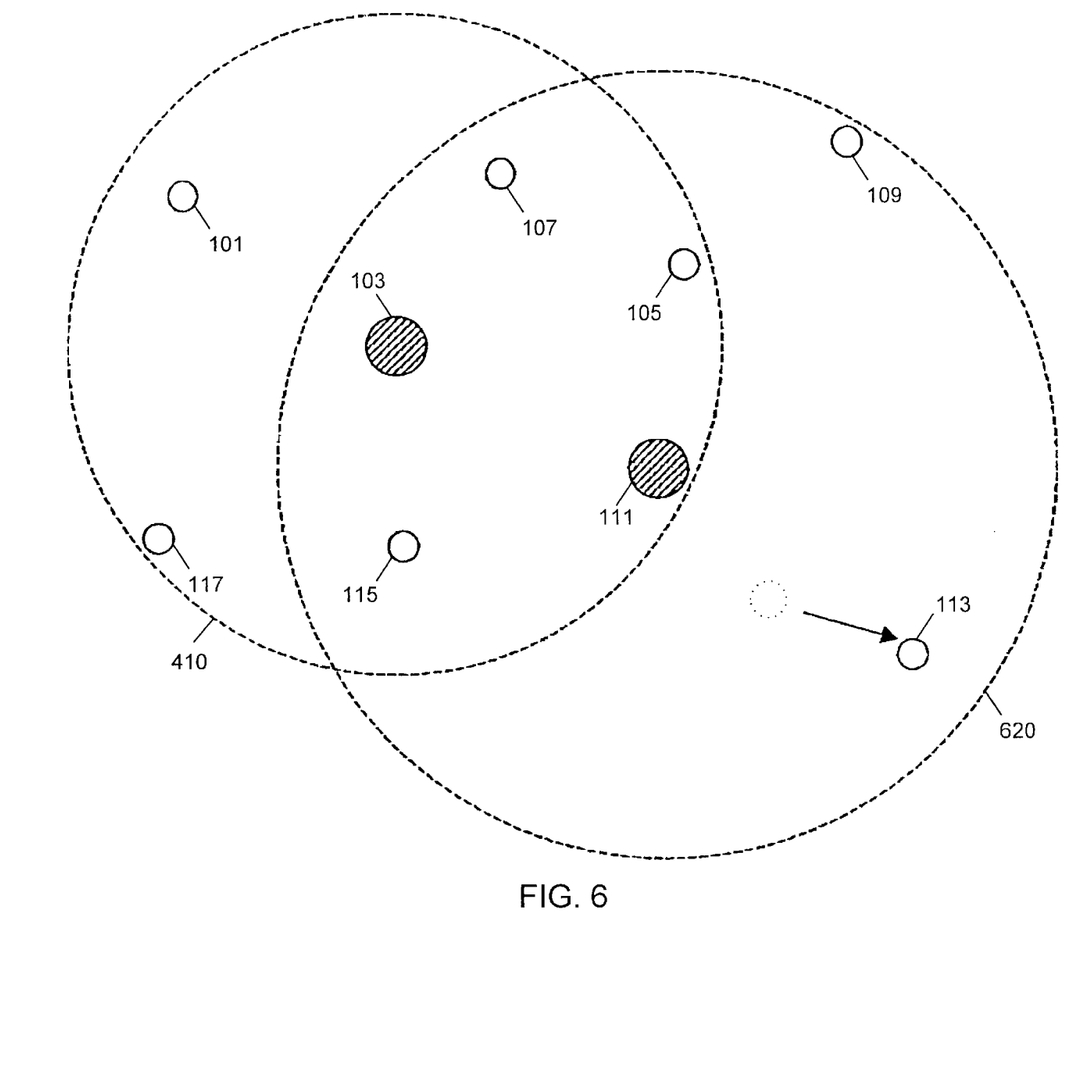
FIG. 6 illustrates reassignment of anchor roles according to the invention.

For example, in FIG. 6, unit 113 has moved out of range of former anchor unit 105 controlling its former anchor piconet. Instead, unit 111 has taken over the anchor unit role and created anchor piconet 620. Unit 111 is selected as the new anchor because its position allows for all units to still be contained within two anchor piconets 410 and 620. It should be noted that unit 111 could have been selected as the anchor unit instead of unit 105, before the movement of unit 113 as shown in FIG. 4. Anchor piconet 410 is unaltered, though unit 115 now has a choice to lock to either or both anchor units 103 or 111. Anchor piconet 420 has been released and former anchor 105 and the remaining slave units are locked to anchor unit 111 in anchor piconet 620.

Figure 7:
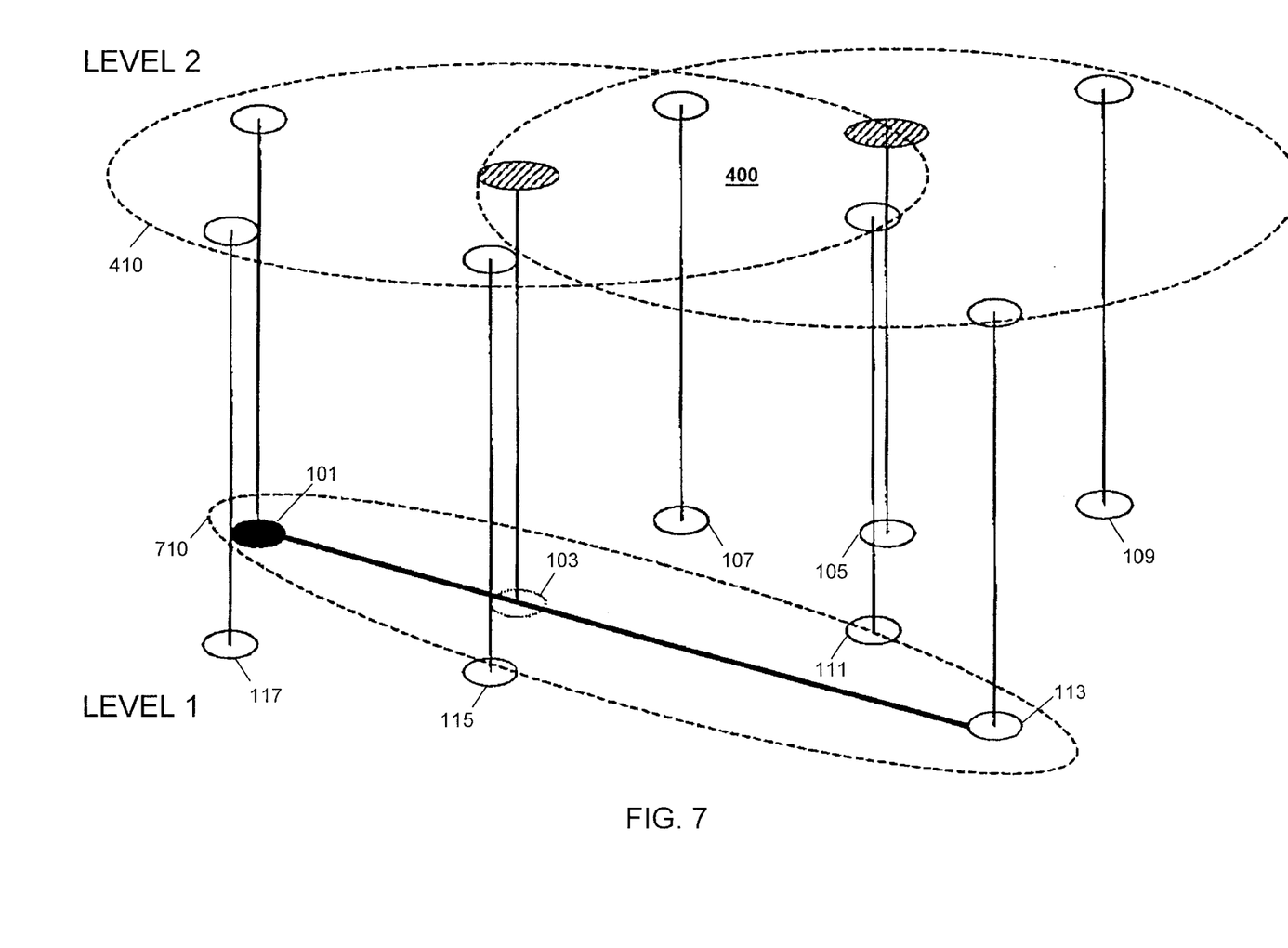
FIG. 7 illustrates an exemplary embodiment of routing through the traffic scatternet according to the invention.

FIG. 7 shows the routing from one unit to another unit. Assume the anchor situation of FIG. 4 and assume that all units are parked to as many anchor units as possible. Therefore, units 101, 115 and 117 are parked to anchor 103. Anchor 105 is also parked to anchor 103 and anchor 103 is parked to anchor 105. Note units 103 and 105 have double roles as anchor units and as parked slaves, in piconets 410 and 420, respectively. Units 109 and 113 are parked to anchor 105. Units 107 and 111 are parked to both anchors 103 and 105. The information about each unit, such as identity, system clock (offset), class of device, and the like, can be distributed among all units or at least is known to the anchor units. For example, if laptop 101 wants to print a file, several options are possible. If units 101 and 113 are within range of each other, a connection can be established directly. Anchor 103 can provide unit 101 with detailed information about unit 113, such as identity and clock. This will speed up the page procedure started by unit 101 since it knows exactly when and what FH channel unit 113 will scan for the page message. Unit 101 can then establish a traffic piconet 710 at level 1 as depicted in FIG. 7. Note that unit 103 is within range of this piconet 710, but is not necessarily part of this piconet. Alternatively, anchor 103 can inform anchor 105 of the link desire. Anchor 105 can then force printer unit 113 to enter the scan state directly and to keep scanning until a page message from unit 101 has been heard and a piconet has been established. Then unit 101 does not even have to wait until unit 113 is awake to listen for page messages as in the normal standby mode.

Figure 8:
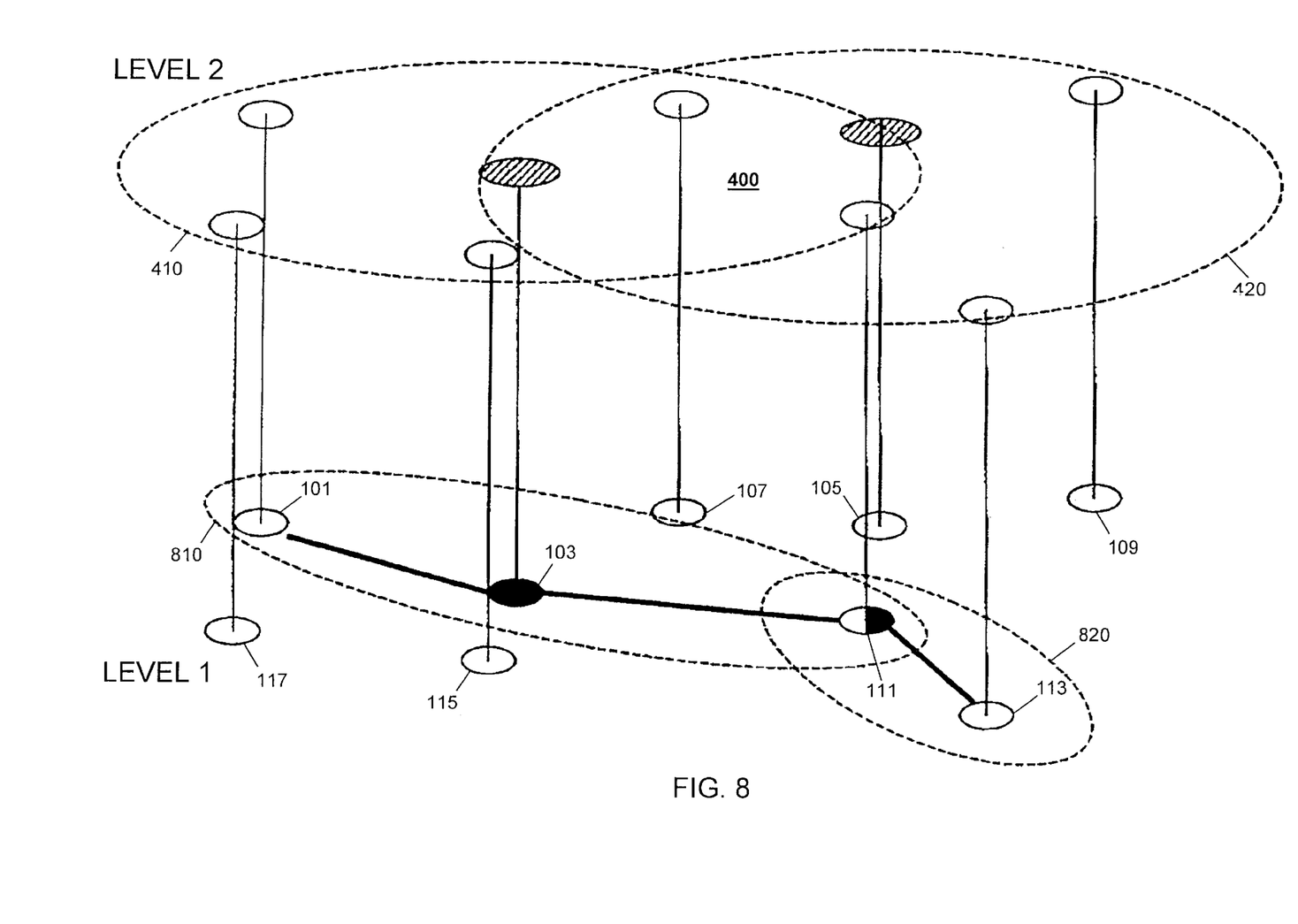
FIG. 8 illustrates an exemplary embodiment of routing through the traffic scatternet according to the invention.

FIG. 8 shows an alternative connection between units 101 and 113. If units 101 and 113 are not within range, a link has to be established via some intermediate units. At the traffic level 1, unit 103 becomes a master of traffic piconet 810 connecting 101 with 111. Unit 111 is both a slave in piconet 810 and master in piconet 820. Unit 111 has established piconet 820 connecting units 111 and 113. Information between units 101 and 113 flows via intermediate units 103 and 111 at the traffic level 1.

Figure 9:
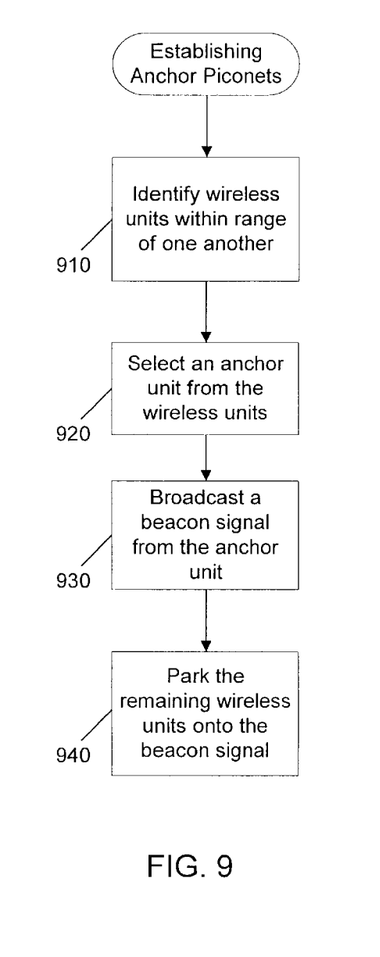
FIG. 9 is a flow chart of an exemplary embodiment of establishing an anchor piconet.

FIG. 9 is a flow chart of an exemplary method of establishing an anchor piconet. The method starts by identifying a plurality of wireless units within range of one another, in step 910. Next, in step 920, an anchor unit is selected from the plurality of wireless units. In step 930, the anchor unit broadcasts a beacon signal, which is received by the remaining wireless units (i.e., all other units within range that are not the anchor). The remaining wireless units are parked onto the beacon signal, whereby the anchor unit and the remaining wireless units together form an anchor piconet, in step 940.

Figure 10:
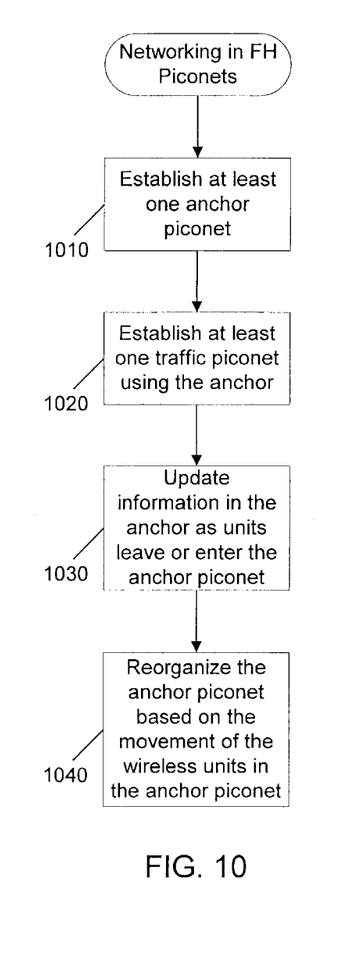
FIG. 10 is a flow chart of an exemplary embodiment of establishing peer-to-peer networks according to the invention.

Referring to FIG. 10, a flow chart of an exemplary method of establishing peer-to-peer networking is shown. The method begins by establishing at least one anchor piconet, in step 1010. It will be appreciated that each anchor piconet can be established as described in relation to FIG. 9. In step 1020, after establishing at least one anchor piconet, at least one traffic piconet between at least two wireless units is established. The traffic piconet could be established between units within one anchor piconet or may extend to units in other anchor piconets as previously described. Regardless, the traffic piconet is established using information relayed from the at least one anchor unit to each wireless unit that participates in the traffic piconet. Because the wireless units are typically mobile, the information in each anchor unit is updated as units leave or enter its anchor piconet, in step 1030. Therefore, the anchor unit will always have current information that can be shared among the remaining units to facilitate establishment of the traffic piconets. As the wireless units change location, it may become necessary to reorganize the anchor piconet. In step 1040, the anchor piconet is reorganized based on the movement of at least one of the wireless units. The reorganizing comprises selecting a new anchor unit from the plurality of wireless units.

When a new unit that is not connected to the anchored scatternet enters the area, it looks for other units to connect to via the conventional inquiry procedure. Certain units in the anchored scatternet which are in range of the new unit respond with their unit information. The new unit can then make a directed page to one of the responding units in the anchored scatternet to connect. Once connected, the new unit may be handed over to an anchor unit via the anchor piconets. If needed, a reorganization of the anchor assignment is also performed, such as described in relation to FIG. 6. The routing and identity information in all units (or only the anchor units) is updated to include the unit that has just joined the anchored scatternet.

In another embodiment, the inquiry response is disabled in all units in the anchor piconets except the anchor units. Therefore, units entering an area covered by an anchor unit will connect directly with the anchor unit. The anchor units preferably indicate in their response that they operate as an anchor unit. Thus, the unit entering the area covered by the anchor piconet can join the anchor piconet directly without using intermediary units. If the area is covered by more than one anchor, then the new unit can park on the anchor that has the strongest signal or alternatively can park on multiple anchor units.

In yet another embodiment, the inquiry response is not disabled in the non-anchor units (i.e., remaining wireless units) in the anchor piconets. However, instead of each wireless unit responding to an inquiry response with its own address and timing, the responding units include its anchor unit's information (i.e., address and timing) in the inquiry response message. Thus, a newly arrived unit can contact the anchor unit directly. If a wireless unit is parked on more than one anchor, then preferably it responds with the information of the anchor from which it receives the strongest beacon signal.

A unit that moves out of range may decide to disconnect from the anchored scatternet. There may also be other reason to disconnect from the anchored scatternet, for example, if there is no need to communicate with the other units, when the battery runs low, and the like. Once disconnected from the anchored scatternet, the unit is then removed from the routing and identity lists.

In another exemplary embodiment of the invention, a frequency hopping communications system of peer-to-peer ad-hoc networks comprises a plurality of wireless units each having low power transceivers such as shown in FIG. 1. The system has logic that establishes at least one anchor piconet. In general, each unit in the system has the same networking logic. However, the system networking logic relies on the cooperation of the units to form the various ad-hoc networks. Therefore, the system capabilities will be attributed to the system and not to the individual units. The system has logic that identifies the plurality of wireless units within range of one another, logic that selects an anchor unit from the plurality of wireless units, logic that broadcasts a beacon signal from the anchor unit and logic that parks the remaining wireless units onto the beacon signal. Additionally, the system has logic that establishes piconets between the units that are in the anchor piconet or anchored scatternet. The piconets are established, by the advantageous methods previously described, using information relayed from the anchor unit to each wireless unit that participates in the traffic piconet.

The invention has been described in connection with a number of exemplary embodiments. To facilitate an understanding of the invention, many aspects of the invention were described in terms of sequences of actions to be performed by elements of a computer-based system. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of a computer readable storage medium having stored therein an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of an embodiment may be referred to herein as "logic configured to" perform a described action, or alternatively as "logic that" performs a described action.

The foregoing has described the principles, preferred embodiments and modes of operation of the invention. However, the invention should not be construed as being limited to the particular embodiments discussed above. For example, some embodiments may have fixed anchors, or a combination of fixed and variable anchors. In the fixed anchor embodiment, for example, a conference room may have a centrally designated anchor unit that is also connected to all the wired devices in the conference facility, such as the LAN, printers, video monitors, sound systems, and the like. As users enter the conference room with wireless equipped units, such as PDAs, laptop computers and the like, the units would become part of the conference room anchor net. The fixed conference room anchor would inform the units of all available resources and ensure fast connection establishment between the units.

Therefore, the above-described embodiments should be regarded as illustrative rather than restrictive, and it should be appreciated that variations may be made in those embodiments by workers skilled in the art without departing from the scope of the invention as defined by the following claims.

What is claimed is:

1. A method of establishing an anchor piconet in a frequency hopping communications system, the method comprising:
   identifying a plurality of wireless units within range of one another;
   selecting an anchor unit from the plurality of wireless units;
   broadcasting a beacon signal from the anchor unit; and
   parking remaining wireless units onto the beacon signal, whereby the anchor unit and the remaining wireless units together form an anchor piconet and wherein the anchor unit relays information that allows the remaining wireless units to create and release independent networks.

2. The method of claim 1, further comprising:
   creating a list of the units in the anchor piconet; and
   storing the list at least in the anchor unit.

3. The method of claim 2, wherein the list comprises routing and identity information for each unit in the anchor piconet.

4. The method of claim 2, further comprising:
   distributing the list to the remaining wireless units in the anchor piconet.

5. The method of claim 2, further comprising:
   updating the list as wireless units leave or enter the anchor piconet.

6. The method of claim 1, wherein selecting the anchor unit comprises:
   using selection criteria to select the anchor unit.

7. The method of claim 6, wherein the selection criteria includes a position of the anchor unit with respect to the remaining wireless units.

8. The method of claim 6, wherein the selection criteria includes the anchor unit's ability to relay information within the anchor piconet.

9. The method of claim 1, further comprising:
   wherein the beacon signal is broadcast on a frequency hopping channel having a sequence and a phase;
   wherein the sequence of the beacon signal is determined by an identity of the anchor unit; and
   wherein the phase of the beacon signal is determined by a system clock of the anchor unit.

10. The method of claim 1, wherein the beacon signal has a broadcast time of about 100 $\mu$s, and an interval between broadcasts in a range of about 10–100 ms.

11. The method of claim 1, wherein the plurality of wireless units are BLUETOOTH™ devices.

12. The method of claim 1, wherein the plurality of wireless units comprise at least one of a group consisting of Personal Digital Assistants, laptop computers, cellular telephones, and wireless headsets.

13. The method of claim 1, further comprising:
   disabling an inquiry response in the remaining wireless units.

14. The method of claim 1, further comprising:
   instructing the remaining wireless units to respond to inquiry messages with the anchor unit's information.

15. A method of peer-to-peer ad-hoc networking in a frequency hopping communications system, the method comprising:
   establishing at least one anchor piconet, wherein the method for establishing each anchor piconet comprises:
   identifying a plurality of wireless units within range of one another;
   selecting an anchor unit from the plurality of wireless units;
   broadcasting a beacon signal from the anchor unit; and
   parking remaining wireless units onto the beacon signal, whereby the anchor unit and the remaining wireless units together form an anchor piconet; and establishing at least one traffic piconet between at least two wireless units in the at least one anchor piconet using information relayed from the at least one anchor unit to each wireless unit that participates in the traffic piconet.

16. The method of claim 15, wherein the information relayed from the at least one anchor unit is derived from a list of the plurality of wireless units in the at least one anchor piconet and wherein the list is stored at least in the at least one anchor unit.

17. The method of claim 16, wherein the list comprises routing and identity information for each unit in the anchor piconet.

18. The method of claim 16, further comprising:
distributing the list to the remaining wireless units in the at least one anchor piconet.

19. The method of claim 16, further comprising:
updating the list as wireless units leave or enter the anchor piconet.

20. The method of claim 15, wherein each anchor unit of at least two anchor piconets is locked to at least one other anchor unit.

21. The method of claim 15, further comprising:
reorganizing the at least one anchor piconet based on movement of at least one of the plurality of wireless units, wherein reorganizing comprises selecting a new anchor unit from the plurality of wireless units.

22. The method of claim 15, wherein the at least one traffic piconet between at least two wireless units is a direct connection.

23. The method of claim 15, wherein at least two traffic piconets are established to connect at least two wireless units via at least one intermediate unit.

24. The method of claim 15, wherein selecting the anchor unit comprises:
using selection criteria to select the anchor unit.

25. The method of claim 24, wherein the selection criteria includes a position of the anchor unit with respect to the remaining wireless units.

26. The method of claim 24, wherein the selection criteria includes the anchor unit's ability to relay information within the anchor piconet.

27. The method of claim 15, wherein the plurality of wireless units are BLUETOOTH™ devices.

28. The method of claim 15, wherein the plurality of wireless units comprise at least one of a group consisting of Personal Digital Assistants, laptop computers, cellular telephones, and wireless headsets.

29. The method of claim 15, wherein the at least one anchor piconet is a minimum number of anchor piconets required to give radio coverage to all wireless units.

30. The method of claim 15, further comprising:
wherein the beacon signal is broadcast on a frequency hopping channel having a sequence and a phase;
wherein the sequence of the beacon signal is determined by an identity of the anchor unit; and
wherein the phase of the beacon signal is determined by a system clock of the anchor unit.

31. The method of claim 15, wherein establishing a traffic piconet takes in a range of about 10–100 ms.

32. The method of claim 15, further comprising:
disabling an inquiry response in the remaining wireless units.

33. The method of claim 15, further comprising:
instructing each remaining wireless unit to respond to inquiry messages with information of the anchor unit that each remaining wireless unit is parked on.

34. A frequency hopping communications system of peer-to-peer ad-hoc networks comprising:
a plurality of wireless units each having low power transceivers;
logic that establishes at least one anchor piconet, wherein the logic that establishes each anchor piconet comprises:
logic that identifies the plurality of wireless units within range of one another;
logic that selects an anchor unit from the plurality of wireless units;
logic that broadcasts a beacon signal from the anchor unit; and
logic that parks remaining wireless units onto the beacon signal, whereby the anchor unit and the remaining wireless units together form an anchor piconet; and
logic that establishes at least one traffic piconet between at least two wireless units in the at least one anchor piconet using information relayed from the at least one anchor unit to each wireless unit that participates in the traffic piconet.

35. The system of claim 34, wherein the information relayed from the at least one anchor unit is derived from a list of the plurality of wireless units in the at least one anchor piconet and wherein the list is stored at least in the at least one anchor unit.

36. The system of claim 35, wherein the list comprises routing and identity information for each unit in the anchor piconet.

37. The system of claim 35, further comprising:
logic that distributes the list to the remaining wireless units in the at least one anchor piconet.

38. The system of claim 35, further comprising:
logic that updates the list as wireless units leave or enter the anchor piconet.

39. The system of claim 34, wherein each anchor unit of at least two anchor piconets is locked to at least one other anchor unit.

40. The system of claim 34, further comprising:
logic that reorganizes the at least one anchor piconet based on movement of at least one of the plurality of wireless units, wherein reorganizing comprises selecting a new anchor unit from the plurality of wireless units.

41. The system of claim 34, wherein the at least one traffic piconet between at least two wireless units is a direct connection.

42. The system of claim 34, wherein at least two traffic piconets are established to connect at least two wireless units via at least one intermediate unit.

43. The system of claim 34, wherein the logic that selects the anchor unit comprises selection criteria to select the anchor unit.

44. The system of claim 43, wherein the selection criteria includes a position of the anchor unit with respect to the remaining wireless units.

45. The system of claim 43, wherein the selection criteria includes the anchor unit's ability to relay information within the anchor piconet.

46. The system of claim 34, wherein the plurality of wireless units are BLUETOOTH™ devices.

47. The system of claim 34, wherein the plurality of wireless units comprise at least one of a group consisting of Personal Digital Assistants, laptop computers, cellular telephones, and wireless headsets.

48. The system of claim 34, wherein the at least one anchor piconet is a minimum number of anchor piconets required to give radio coverage to all wireless units.

49. The system of claim 34, further comprising:

wherein the beacon signal is broadcast on a frequency hopping channel having a sequence and a phase;

wherein the sequence of the beacon signal is determined by an identity of the anchor unit; and wherein the phase of the beacon signal is determined by a system clock of the anchor unit.

50. The system of claim 34, wherein a traffic piconet is established in a range of about 10–100 ms.

51. The system of claim 34, further comprising:

logic that disables an inquiry response in the remaining wireless units.

52. The system of claim 34, further comprising:

logic that instructs each remaining wireless unit to respond to inquiry messages with information of the anchor unit that each remaining wireless unit is parked on.

* * * * *